Figure 1:
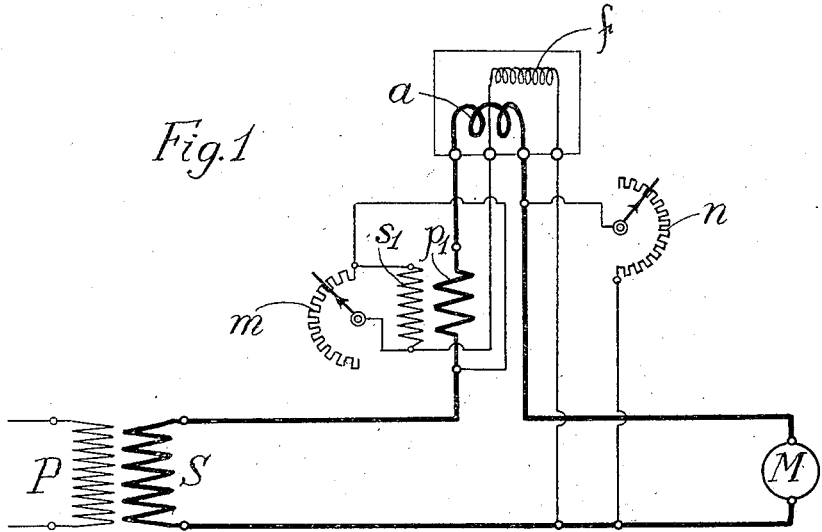

Jan. 2, 1933.  O. SZILAS ET AL  1,942,193

ELECTRIC ENERGY INDICATING INSTRUMENT

Filed Nov. 30, 1931

Inventors:
Oscar Szilas
Nicholas Székely
by [signature]
their Attorney.

Patented Jan. 2, 1934

1,942,193

UNITED STATES PATENT OFFICE 1,942,193

ELECTRIC ENERGY INDICATING INSTRUMENT

Oscar Szilas and Nicholas Székely, Budapest, Hungary

Application November 30, 1931, Serial No. 578,226, and in Hungary December 5, 1930

3 Claims. (Cl. 171—264)

The object of this invention is to provide an apparatus adapted to indicate or measure alternating current energy in such a manner as to take account of transmission or transformation losses which occur before the current reaches, or after it has left, the place of measuring. Thus, in the case of step-down transformers, for instance, the total energy taken up on the high-voltage input side of the transformer should be measured by means of apparatus connected to the low-voltage output side only of the transformer and capable of responding not only to the net output of the low-voltage side of the transformer but also to the losses in the transformer. Or the invention should afford the possibility of observing the losses of energy in a transmission line either in the manner that in a meter installed at the input end of the transmission line, the losses occurring in the transmission line are deducted from the energy supplied to the transmission line at its input end, or in the manner that in a meter arranged at the output end of the transmission line, the energy lost in the transmission line is added to the energy available at the output end.

Even losses of a non-electrical nature, e. g. mechanical losses can be observed by means of an apparatus according to the invention. Thus for instance, the mechanical energy absorbed by a dynamo may be measured by a meter connected to the terminals of the dynamo.

Accordingly, the invention permits to measure electrical energy either in the manner that the losses which have occurred in advance of the place of measuring are added to, or in the manner that the losses which occur behind the place of measuring are deducted from, the energy which an ordinary meter would record. The invention permits to observe losses made up of a component independent of the load and of another component depending on the load. Observation of the losses is realized according to the invention by producing in an ordinary meter an additional torque corresponding as to its magnitude and direction to the losses, a torque corresponding to the losses independent of the load being produced by the introduction into the meter of an additional amount of current, and a torque corresponding to the losses depending on the load being produced by the introduction into the meter of an additional electromotive force. The additional current and the additional electromotive force may be obtained by means of merely ohmic resistances connected in the circuit of the current coil and potential coil, respectively, of the meter in the manner required according to whether the additional torque has to act cumulatively or differentially. The resistance to be connected in the circuit of the current coil is so designed or adjusted as to provide an additional current adapted to produce, in conjunction with the electromotive force introduced into the meter, a torque corresponding to the losses independent of the load. The resistance to be connected in the circuit of the potential coil is so designed or so adjusted as to provide an additional electromotive force adapted to produce, in conjunction with the current introduced into the meter, a torque corresponding to the losses depending on the load.

For the purpose of measuring the energy supplied to a step-down transformer on its high-voltage input side, it has already been proposed to transfer the potential coil of the meter to the low-voltage output side of the transformer and to compensate for the voltage drop in the transformer by inserting, in series with the potential coil, an impedance designed to suit the transformer on short circuit, the meter current having been taken from a current transformer connected to the high-voltage input side of the transformer. According to the invention, the entire measuring or indicating apparatus is arranged on the low-voltage output side of the transformer and the loss energy is compensated as a whole by an additional torque produced in the meter, individual compensation for the factors of this energy, viz, current and voltage, being dispensed with. That is why the above-mentioned impedance can be replaced by an ohmic resistance.

Figure 2:
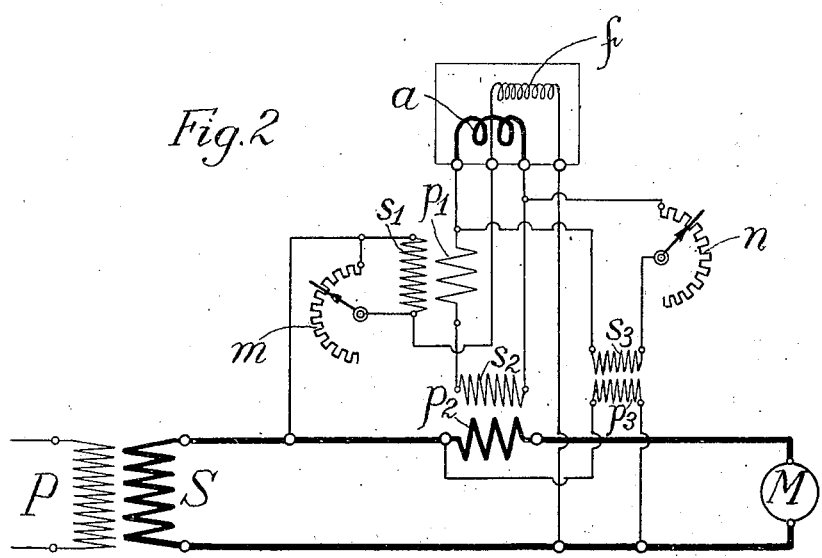

In the accompanying drawing, Fig. 1 is a diagrammatic representation of an embodiment of the invention exemplifying its use for measuring the energy supplied to a step-down power transformer on its input side by means of apparatus connected to the output side. Fig. 2 is a diagrammatic representation of a modification.

In both figures of the drawing, P denotes the primary winding and S the secondary winding of the power transformer; $a$ denotes the current coil, $f$ the potential coil of a meter, $n$ and $m$ denote variable ohmic resistances by means of which the additional current and electromotive force, respectively, are introduced into the meter, whilst M denotes the consumer fed from the secondary winding S.

In the diagram of connections according to Fig. 1, the current coil $a$ is connected in the consumer circuit, whilst the resistance $n$ through which the additional current flows is connected in parallel to the consumer M. When consumer M is put out of circuit a current will still flow through the current coil $a$, the magnitude of this current being so adjusted by means of the resistance $n$ that the meter will indicate a load equal to the no-load losses of the transformer PS. When consumer M is connected in, also the load current of the same will flow through the current coil $a$ so that the meter will record the useful consumption together with the no-load energy.

The resistance $m$ from which the additional electromotive force is taken is connected to the terminals of the secondary winding $s_1$ of a current transformer, the primary $p_1$ of which is connected in series with the current coil $a$. This resistance $m$ will, therefore, receive a current proportionate to and in phase with the load current of the transformer PS and is so designed or adjusted as to produce a voltage drop equal to the figure, expressed for the secondary side, of the voltage drop in the windings of the transformer PS on load. In order to introduce into the meter the voltage drop in the resistance $m$ so as to be added to the secondary terminal voltage of the transformer PS, the resistance $m$ is connected in series with the potential coil $f$, and this group $m, f$ is connected to the secondary terminals of the transformer PS. It is immaterial whether the potential circuit $m, f$ is connected in front of or behind the primary winding $p_1$ of the current transformer.

In case the load of the transformer PS is of such magnitude as to prohibit the load current from being directly passed through the current coil $a$, the arrangement shown in Fig. 2 is employed, in which a current transformer $p_2 s_2$ is used for introducing the load current into the meter.

In order to obtain the additional current in an economical manner, resistance $n$ should also be fed by the intermediary of a potential transformer $p_3 s_3$ as shown in Fig. 2.

Kilowatt indicators may be employed instead of kilowatt-hour meters without any alteration of the connections described.

As in multiphase systems or single-phase systems with more than two conductors, the phase and part voltages, respectively, are kept as a rule practically equal, it suffices to introduce the additional current into one of the current coils of the composite meters used in such systems. If the outside conductors carry equal loads, also the additional electromotive force need not be introduced into more than one of the potential coils.

If it is desired to measure, in the case of step-up transformers, the useful energy output of the high-voltage secondary side by means of apparatus connected exclusively to the low-voltage primary side, the transformer losses must be deducted from the primary energy. For this purpose the connections shown in Figs. 1 and 2 are so modified that the additional current and the additional electromotive force are introduced in the opposite sense into the meter.

In case it is desired to measure the energy transmitted over transmission lines in such a manner as to take account of the transmission losses, those parts of the losses that are independent of the load,—as dielectric losses of the condensers formed by the insulation, radiation and conduction losses—are compensated for by means of the additional current, whilst the ohmic losses which depend on the load are compensated for by means of the additional electromotive force. If measuring is effected at the input end of the transmission line, the additional quantities are so introduced as to act differentially in order to have the useful energy available at the far end of the transmission line measured. If, on the other hand, it is desired to measure, at the output end of the transmission line, the total quantity of energy supplied to the transmission line at its input end, the additional quantities are so introduced as to act cumulatively.

Similarly, the mechanical energy taken up by dynamos and the useful mechanical energy supplied by electric motors may be measured by producing in an ordinary meter an additional torque which will act cumulatively in the case of dynamos and differentially in the case of motors. The losses independent of the load are compensated for by means of a resistance connected as resistance $n$, whilst the losses depending on the load by means of a resistance connected as resistance $m$ in Fig. 1 or 2.

What we claim is:—

1. In an apparatus for measuring alternating current energy in such a manner as to take account of energy losses, the combination of a current coil, a potential coil, a merely ohmic resistance receiving through said current coil a voltage proportional to the line voltage at the place of measuring and adapted to introduce into said current coil an additional amount of current capable of producing in conjunction with the electromotive force of said potential coil a torque corresponding to such losses as are independent of the load; and another merely ohmic resistance connected in the circuit of said potential coil and supplied with a current proportional to that in the current coil and adapted to introduce into said potential coil an additional electromotive force capable of producing in conjunction with the current in said current coil a torque corresponding to such losses as depend on the load.

2. In an apparatus for measuring alternating current energy in such a manner as to take account of such energy losses as are independent of the load, the combination of a current coil, a potential coil, and a merely ohmic resistance receiving through said current coil a voltage proportional to the line voltage at the place of measuring and adapted to introduce into said current coil an additional amount of current capable of producing in conjunction with the electromotive force of said potential coil a torque corresponding to said energy losses.

3. In an apparatus for measuring alternating current energy in such a manner as to take account of such energy losses as depend on the load, the combination of a current coil, a potential coil, and a merely ohmic resistance connected in the circuit of said potential coil and supplied with a current proportional to that in the current coil and adapted to introduce into said potential coil an additional electromotive force capable of producing in conjunction with the current in said current coil a torque corresponding to the losses to be taken account of.

OSCAR SZILAS.
NICHOLAS SZÉKELY.